US008818763B2

(12) United States Patent
Ji et al.

(10) Patent No.: US 8,818,763 B2
(45) Date of Patent: Aug. 26, 2014

(54) SEISMIC ACQUISITION AND FILTERING

(75) Inventors: Ying Ji, Cambridge (GB); Julian Edward Kragh, Cambridge (GB); Ali Ozbek, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 443 days.

(21) Appl. No.: 13/204,189

(22) Filed: Aug. 5, 2011

(65) Prior Publication Data
US 2012/0063265 A1 Mar. 15, 2012

(30) Foreign Application Priority Data

Aug. 6, 2010 (GB) .................................. 1013228.0

(51) Int. Cl.
G01V 3/00 (2006.01)
G01V 1/00 (2006.01)
G01V 1/36 (2006.01)

(52) U.S. Cl.
CPC ........ G01V 1/364 (2013.01); *G01V 2210/3246* (2013.01); *G01V 2210/47* (2013.01)
USPC ........................................... 702/191; 367/43

(58) Field of Classification Search
CPC ...... G01V 2210/47; G01V 1/364; G01V 1/28
USPC ............. 702/191, 1–2, 14–18, 127, 189–190, 702/194; 367/14, 36–38, 43–49, 62, 73, 87, 367/89; 703/2, 5
See application file for complete search history.

(56) References Cited

U.S. PATENT DOCUMENTS

| 6,393,365 | B1 | 5/2002 | Runnestrand et al. |
| 6,446,008 | B1 | 9/2002 | Ozbek |
| 6,651,007 | B2 | 11/2003 | Ozbek |
| 7,584,057 | B2 | 9/2009 | Özbek et al. |
| 2002/0118602 | A1 | 8/2002 | Sen et al. |
| 2005/0174885 | A1 | 8/2005 | Robinson |
| 2008/0221801 | A1 | 9/2008 | Craft et al. |
| 2011/0060528 | A1 | 3/2011 | Ozbek et al. |

FOREIGN PATENT DOCUMENTS

| GB | 2350191 A | 11/2000 |
| GB | 2375606 A | 11/2002 |
| WO | 03081283 A2 | 10/2003 |
| WO | 2004020972 A2 | 3/2004 |

OTHER PUBLICATIONS

Dev et al., Spatial Antialias Filtering in the Slowness-Frequency Domain, Mar.-Apr. 2009, Geophysics, vol. 74, No. 2, pp. V35-V42.*

(Continued)

*Primary Examiner* — Toan Le
(74) *Attorney, Agent, or Firm* — Daniel S. Matthews

(57) ABSTRACT

Designing a multi-dimensional Finite Impulse Response FIR digital filter to attenuate the coherent noise while preserving reflection signals on seismic data, particular in land seismics, includes computing filter coefficients to minimize an l-norm function of differences between a response of a filter with the computed coefficients and a predetermined response which attenuates signals outside a predetermined range of slowness relative to signals within the predetermined range of slowness. Additional constraints may be imposed on the coefficients to improve the attenuation of signals outside the predetermined range of slowness of the desired reflection signals, and/or to improve uniformity within the desired range.

17 Claims, 3 Drawing Sheets

(56) References Cited

OTHER PUBLICATIONS

Ait-Messaoud et al: "New dimensions in land seismic technology", Oilfield Review, Autumn 2005, pp. 42-53.

Alam et al: "Optimal maneuvering of seismic sensors for localization of subsurface targets", IEEE Transactions on Geoscience and Remote Sensing, vol. 45, No. 5, May 2007, pp. 1247-1257.

Eberhart et al: "A new optimizer using particle swarm theory", IEEE (Institute of Electrical and Electronics Engineers) Sixth International Symposium on Micro Machine and Human Science, 1995, pp. 39-43.

Griffiths et al: "Quiescent pattern control in linearly constrained adaptive arrays", IEEE Transactions on Acoustics, Speech, and Signal Processing, vol. ASSP-35, No. 7, Jul. 1987, pp. 917-926.

Ji et al: "Noise attenuation methods for point-receiver land seismic data", SEG (Society of Exploration Geophysicists) Expanded Abstracts 29, Denver 2010 Annual Meeting, pp. 3545-3549.

Madisetti et al: "Digital filtering", The Digital Signal Processing Handbook. A CRC handbook published in cooperation with IEEE Press, 1997, Chapter 11, pp. 11-1 to 11-86.

Tseng et al: "A simple algorithm to achieve desired patterns for arbitrary arrays", IEEE Transactions on Signal Processing, vol. 40, No. 11, 1992, pp. 2737-2746.

Özbek et al: "Multi-dimensional filtering of seismic data sampled on an irregular grid", EAGE Fall Research Workshop on Advances in Seismic Acquisition Technology, Rhodes, Greece, Sep. 19-23, 2004.

Özbek et al: "Multidimensional filtering of irregularly sampled seismic data", EAGE 67th Conference and Exhibition, Madrid, Spain, Jun. 13-16, 2005, A037.

Özbek et al: "3-D filter design on a hexagonal grid with applications to point-receiver land acquisition", SEG International Exposition and 74th Annual Meeting, Denver, Colorado, Oct. 10-15, 2004.

Combined Search and Examination Report of British Application No. GB 1013228.0 dated Feb. 2, 2011.

\* cited by examiner

SEISMIC ACQUISITION AND FILTERING

FIELD OF THE INVENTION

The present invention generally relates to apparatus and methods for acquiring seismic signal and filtering such data. More particularly it relates to designing a digital filter to attenuate the coherent noise while preserving reflection signals on seismic data, particularly in land seismics, but it may also be employed with marine seismic signals.

BACKGROUND OF THE INVENTION

Seismic data is collected to analyze the subsurface of the Earth, and is particularly collected in connection with hydrocarbon exploration and production activities. Seismic data for analyzing subsurface structures may be collected on land or over water. In order to obtain seismic data, an acoustic source is used which typically consists of explosives or a seismic vibrator on land or an impulse of compressed air at sea. The seismic signals reflected by the various geologic layers beneath the surface of the Earth are known as traces and are sensed by a large number, typically hundreds or thousands, of sensors such as geophones on land and hydrophones at sea. The reflected signals are recorded and the results are analyzed to derive an indication of the geology in the subsurface. Such indications may then be used to assess the likelihood and location of potential hydrocarbon deposits.

Seismic surveys are generally conducted using one or more receiver lines having a plurality of receiver station locations spaced evenly along their lengths. In a two dimensional (2D) survey, a single receiver line is used and the acoustic source is typically positioned at various points in-line with the receiver line. In a three dimensional survey, a plurality of parallel receiver lines are typically used and the acoustic source is generally positioned at various points offset from the receiver lines. While a 2D seismic survey can only create a cross-sectional representation of the subsurface, a 3D seismic survey can be used to develop a three dimensional representation of the subsurface.

The desired reflection signals can be masked by noise. Seismic data are subject to a wide variety of noise related problems that can and do limit its usefulness. Broadly speaking, noise found in seismic traces is either incoherent or coherent. Incoherent ambient noise, or uncorrelated "white" noise, is ubiquitous and is generally greatly attenuated through the simple expedient of stacking, although extremely large individual data values ("spikes") and "bad" traces often need special attention. Coherent, or correlated, noise on the other hand cannot usually be so readily eliminated. Some common examples of coherent noise (some of which affect land surveys more than surveys) include multiple reflections, ground roll generated by the seismic source vibrations, air waves, guided waves, sideswipe, cable noise and 60 hertz power line noise.

In conventional seismic data acquisition systems, data are inherently filtered through use of "hard-wired" (electrically connected) groups of sensors. A group or receiver array delivers a single output trace (the normalized sum or arithmetic average of the output of all individual sensors of the group) at the particular receiver station location about which the sensors are placed. The single trace is the normalized sum or arithmetic average of the output of all individual sensors making up the group.

More recently, however, seismic surveys have been performed using receiver systems referred to as "single sensor" or "point receiver" in which the digital outputs of multiple sensors are [recorded and] processed individually. The inherent filtering effect of the hard-wired group is then replaced by signal filters that are better adapted to the nature of seismic noise and preserve more of the seismic reflection signals. Transition to point receiver arrays for land seismic has been described in "New Directions in land Seismic Technology" in *Oilfield Review*, Autumn 2005 pages 42-53.

U.S. Pat. Nos. 6,446,008 and 7,584,057 both disclose filtering of signals to remove noise. The latter document discloses use of a mathematical technique, Alternating Projections onto Convex Sets (APOCS), to design multi-dimensional digital filters for land seismic.

Filters for signals are classified as either infinite impulse response (IIR) filters which theoretically produce an output for an indefinite period after receiving an input signal and finite impulse response (FIR) filters which return to zero output within a finite period (or at once) when input ceases. Filters are also classified as adaptive, if the filter coefficients change in response to the signal data encountered (which may be recorded signal data) or as fixed or non-adaptive if the filter coefficients or the manner in which they are calculated is predetermined without detailed knowledge of the signal data.

A filter for digital signals can be implemented in software as computational processing of the signal data (which may be recorded signal data). The filter applies coefficients to alter the amplitude of the signal data and in doing so attenuates parts of that data relative to other parts, with the objective of attenuating the parts which are unwanted noise. Design of such a filter entails computation of the coefficients. The characteristics of a filter are generally referred to as its response.

It is an object of the present invention to provide methods for processing seismic data, particularly methods for designing and applying filters for such data.

SUMMARY OF THE INVENTION

Design of optimal multi-dimensional Finite Impulse Response (FIR) of digital filters is important for seismic data acquisition recorded using point receivers.

In a first aspect, the present invention provides a computational method of processing digital seismic signals received at a plurality of individual sensors spaced apart from one another by applying filter coefficients to signals from individual sensors, wherein the computational method comprises computing filter coefficients to minimise an l-norm function of differences between a response of a filter with the computed coefficients and a predetermined response which attenuates signals outside a predetermined range of slowness relative to signals within the predetermined range of slowness.

In embodiments of this invention, the predetermined response would generally be unity within a predetermined range of slowness associated with desired reflection signals and a zero value outside this range of slowness. Thus the predetermined range of slowness defines a passband containing the desired signals while outside the passband there are stopbands in which signals are attenuated. The stopbands at either side of a passband are sometimes referred to as sidelobes.

Embodiments of this filter are classed as an FIR filter and also as a fixed (i.e. non-adaptive) filter because filter behaviour is defined without detailed knowledge of specific data.

In some embodiments of the invention the value of l in the l-norm function is 2, so that the function is the mean square of differences between the filter response and the predetermined response. Minimising this function leads to a least mean square difference between the filter response and the predetermined response.

This minimisation of the function may be done with signals at a single frequency creating a narrowband filter suitable for processing signals within a small range of frequencies. However, it may be done with filter responses and predetermined responses over a range of frequencies to provide a broadband filter. Possibly the predetermined response will be the same for the whole range of frequencies.

It is an advantage that embodiments of this invention can provide a filter for seismic data which comprises a plurality of traces representing seismic energy received as a function of time at sensors at a plurality of locations which may be regularly spaced or irregularly spaced. A further advantage is that the filters can be suitable for multidimensional seismic data and so can be used if the receivers are distributed uniformly or irregularly along one or more lines or even if they are distributed irregularly over an area.

In a development of this invention, the coefficients computed by minimising the l-norm function may be subject to additional constraints, for example to smooth the seismic signals.

A method as any above may be carried out to process data as it is received, or it may be used to process seismic signal data which has been stored on a computer-readable storage medium. A method as any above may further include determining one or more parameters related to physical properties of the earth's interior from the processed seismic signals.

In another aspect, this invention provides a method of seismic surveying comprising:
propagating an acoustic or electromagnetic field through at least one subsurface layer of the earth;
acquiring data at a plurality of discrete locations; and
processing the data according to a method as any above.

The invention also provides a system comprising both an interface to receive data indicative of a signal derived from a seismic acquisition and a computer to process the received data by a method as any above. The invention further includes a computer program comprising instructions for carrying out a method as any above, and a computer readable storage medium having such a computer program stored thereon.

The invention will be further explained and exemplified by the following detailed description and with reference to the accompanying drawings. This description is exemplary in nature and is not intended to limit the scope of the invention. Except where clearly inappropriate or expressly noted, features and components of different embodiments may be employed separately or used in any combination.

BRIEF DESCRIPTION OF THE DRAWINGS

FIG. 2 shows examples of the amplitude response (against slowness) of the filter which has been computed when the l-norm function is a weighted least square function. The passband is for a slowness range between 0 and ~0.0005 (sec/meter) in either direction and the stopbands at either side are for slownesses larger than 0.001 (sec/meter) in either direction.

DETAILED DESCRIPTION

Figure 1:
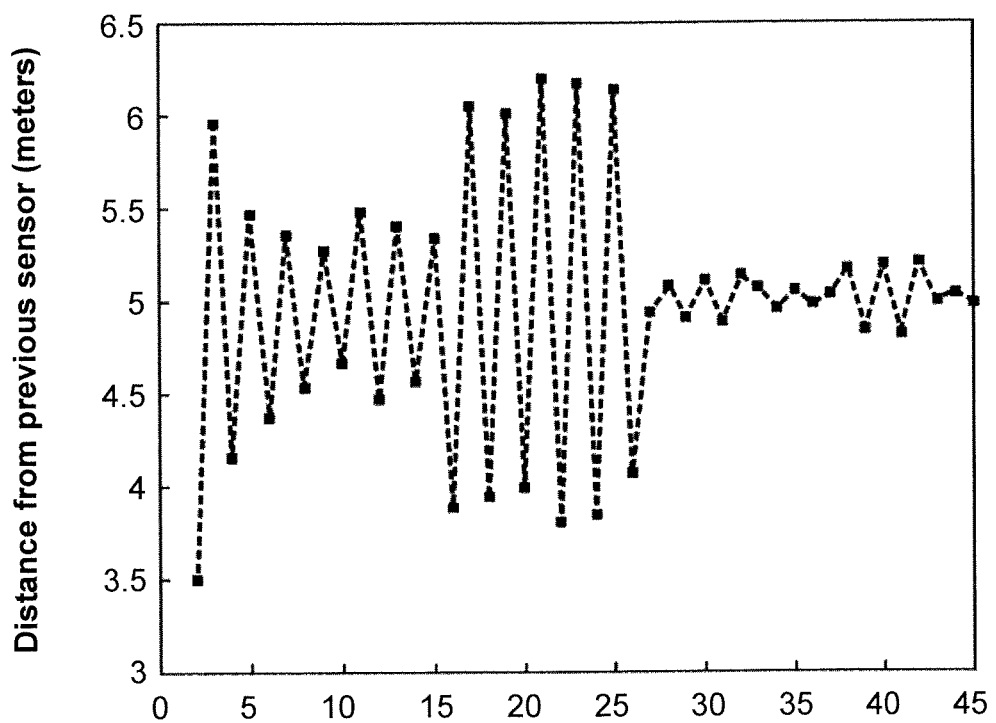
FIG. 1 shows sensor intervals for a set of 45 sensors with irregular spacing along a line.

Seismic signals of frequency and amplitude are received at each sensor in a set of L sensors. The slowness (reciprocal of velocity) of the signal is also determined from the time difference between the arrival of signals at sensors with a known spacing between them. The data from each sensor is available in digital form.

The following description of the filter design relates to a 3D survey. All positions and slowness are vectors, denoted with bold font, and multiplication between positions and slowness is the dot product.

Denoting the unfiltered primary trace at frequency $\omega$ and slowness p as $x_0(\omega, p)$ and the filtered output as $y(\omega, p)$ the relationship between them can be formulated as $$y(\omega, p) = \sum_{i=0}^{L-1} w_i(\omega) x_i(\omega, p) = \sum_{i=0}^{L-1} w_i(\omega) e^{-j\omega p \cdot x_i} x_0(\omega, p) = H(\omega, p) x_0(\omega, p) \quad (1)$$

where $x_i$, $w_i(\omega)$, are the sensor positions and filter coefficients, respectively and i is a series of integers i=0, ..., L−1.

$H(\omega, p)$ is the filter FIR response. It can also be written as $$H(\omega, p) = \sum_{i=0}^{L-1} w_i(\omega) e^{-j\omega p \cdot (x_i - x_0)} = w^T s \quad (2)$$

where $$w = \begin{pmatrix} w_0 \\ \vdots \\ w_{L-1} \end{pmatrix} \text{ and } s = \begin{pmatrix} e^{-j\omega p \cdot x_0} \\ \vdots \\ e^{-j\omega p \cdot x_{L-1}} \end{pmatrix} \quad (3)$$

s is the steering vector.

The optimal filter coefficients w can be found by minimizing a weighted l-norm error function between $H(\omega, p)$ and a desired response $D(\omega, p)$ subject to some linear constraints.

In accordance with an embodiment of this invention the filter coefficients are determined by minimising an l-norm error function (also referred to as a cost function) between the above filter response $H(\omega, p)$ and a predetermined desired response $D(\omega, p)$ which attenuates signals outside a defined range of slowness relative to signals within the defined range of slowness. This defined range of slowness is referred to as the passband and is selected to contain desired reflection signals but exclude noise. Ranges of slowness outside the passband and are referred to as stopbands (sometimes referred to as sidelobes).

A line of receivers may observe seismic signals travelling in either direction projected on the receiver line. Signals travelling in one direction may be assigned a positive value of slowness while signals travelling in the reverse direction are assigned a negative value of slowness. Consequently the passband may extend over a range of slowness from a negative value through zero to a positive value with stopbands at either side of the passband.

The error or cost function at frequency $\omega$ can be written as $$J(w) = \int U(\omega, p) |D(\omega, p) - H(\omega, p)|^l dp$$

where U(ω, p) denotes a chosen weighting factor which may be employed in some embodiments of the invention. In accordance with this invention, this error function is minimised. Filtering by reference to a desired slowness passband and slowness stopbands imposes constraint on the signals which are being processed and preserves the desired reflection signals with attenuation of unwanted noise signals, such as ground roll.

The result may be an approximation to the desired outcome and further linear constraints on the data may be employed so that the minimized error function is written as $$\min J(w) = \int U(\omega,p)|D(\omega,p)-H(\omega,p)|^l dp \text{ subject to}$$
$$Cw=f \quad (4)$$

where C is N×L matrix which defines N linear constraints and f is a N dimensional vector (as mentioned earlier, L is the number of sensors in the set). The choice of l in equation (4) depends on the application of the filter.

In some embodiments of this invention, the value of l in the l-norm error function may be set to 2, so that the error function is the mean squares of differences between the filter response and the desired response. In this case the minimized function at frequency ω and slowness p is a least mean squares function and can be written as $$\min J(w) = \int U(\omega,p)|D(\omega,p)-H(\omega,p)|^2 dp \text{ subject to}$$
$$Cw=f \quad (5)$$

If required, for example to eliminate outlying data points or to reduce their effect on the overall data, some other value of l may be used. One possibility is that l may be set to infinity so that the error function is a minmax function. In this case the minimised function can be written as $$\min J(w) = \max U(\omega,p)|D(\omega,p)-H(\omega,p)| \text{ for all } p \text{ (exclude transition), subject to } Cw=f \quad (6)$$

The matrix C of linear constraints can be constructed by specifying the response at some particular slowness, or at some slowness ranges, and can be formulated as $$(s_1^T \ldots s_M^T) \text{ where } s_i \text{ are steering vectors and } i=1, 2 \ldots M, \text{ so that } (s_1^T \ldots s_M^T)^T w = f \quad (7)$$

For the slowness in the pass band (signal protection region), values f in vector f may be set to one, and for slowness in the stop band (noise region), values f may be set to zero.

The derivative of steering vector v with respect to slowness can also be used in the construction of linear constraints. When more constraints are added, the constraints can cease to be independent and the matrix C becomes singular. The principal component analysis technique can then be used to remove the singularity of C.

The equations above refer to an individual frequency ω. They could be applied to a small band of frequencies to provide a narrowband filter. For a broadband filter which is to be used for signals with a wider range of frequencies, the filter FIR response can be written as $$H(\omega, p) = \sum_{i=0}^{L-1} \sum_{k=0}^{K} w_{i,k}(\omega) e^{-j\omega(k+p \cdot x_i)} = w^T s \quad (8)$$

where $$w = (w_{0,0} \ldots w_{0,K-1} \ldots w_{L-1,0} \ldots w_{L-1,K-1})^T$$

and $$s = (e^{-j\omega p \cdot x_0} \ldots e^{-j\omega(K-1+p \cdot x_0)} \ldots e^{-j\omega p \cdot x_{L-1}} \ldots e^{-j\omega(K-1+p \cdot x_{L-1})})^T \quad (9)$$

The minimised error function (also termed cost function) for determining the optimal broadband filter coefficients can be written as $$\min J(w) = \iint U(\omega,p)|D(\omega,p)-H(\omega,p)|^l d\omega dp \text{ subject to}$$
$$Cw=f \quad (10)$$

The linear constraints matrix C is constructed in the same manner as for equation (7) above, using the broadband steering vector of equation (9). If l is set to 2 so that the error function is a least square function, the minimised function can be written as $$\min J(w) = \iint U(\omega,p)|D(\omega,p)-H(\omega,p)|^2 d\omega dp \text{ subject to}$$
$$Cw=f \quad (11)$$

and the weighted min-max can be written as $$\min J(w) = \max U(\omega,p)|D(\omega,p)-H(\omega,p)| \text{ for all } \omega \text{ and } p$$
$$\text{(exclude transition) subject to } Cw=f \quad (12)$$

Cost function J(w) as in equation (4) or equation (10) may have local minima and its gradient information is difficult to compute when the value of l is other than 2. Possible methods for computing a solution of these equations which do not use any gradient information of the cost function are Genetic Algorithm and Particle Swarm Optimization (PSO). Use of PSO to determine filter coefficients may proceed as follows
1. Define the search space for each filter coefficient, the size of population, the number of groups, initialize the population by randomly sampling the whole search space and initialize the particle position $w_n$ and moving velocity vector $v_n$ with zeros.
2. Evaluate the fitness for each particle (more detail for this step is given below)
3. Update the particle moving velocity according to the following equation $$v_{n+1} = bv_n + a_1 d_1 (\text{pbest}_n - w_n) + a_2 d_2 (\text{gbest}_n - w_n) \quad (13)$$

where $d_1$ and $d_2$ are random positive numbers in the range [0,1], b is the inertial weight that determines to what the particle extend remains along its original direction. $\text{pbest}_n$ is the best particle in the group, $\text{gbest}_n$ is the best particle in the whole population. $a_2$ and $a_2$ are acceleration constants, which attracted each particle towards its $\text{pbest}_n$ and $\text{gbest}_n$.
4. The new particle position is computed using the following equation $$w_{n+1} = w_n + v_n \Delta t \quad (14)$$

5. Repeat 2-4 until a stop criterion is met.
The fitness function used in step 2 is defined as $$fitness = J(w) + \sum_i a_i |s_i^T w - f_i| \quad (15)$$

where $a_i$ is the penalty factor and $f_i$ is the element of f in equation (7).

However, a close-form and computationally simple solution for the weighted least square (i.e. l=2) is also possible. By using the Lagrange multiplier method, the optimal coefficients w of equation (5) can be written as $$w_{opt} = A^{-1} r - A^{-1} C^H (CA^{-1} C^H)^{-1} (CA^{-1} r - f) \quad (16)$$

where $$A = \int_{passband} U(\omega, p)v(\omega, p)v^H(\omega, p)dp + \qquad (17a)$$

$$\int_{stopband} U(\omega, p)v(\omega, p)v^H(\omega, p)dp$$

$$r = \int_{passband} 2U(\omega, p)\text{Re}(v^H(\omega, p))dp \qquad (17b)$$

for single frequency filter, and $$A = \int\int_{passband} U(\omega, p)v(\omega, p)v^H(\omega, p)d\omega dp + \qquad (18a)$$

$$\int\int_{stopband} U(\omega, p)v(\omega, p)v^H(\omega, p)d\omega dp$$

$$r = \int\int_{passband} 2U(\omega, p)\text{Re}(v^H(\omega, p))d\omega dp \qquad (18b)$$

for the broadband filter. The first term in equation (16) is the weighted least square solution without any constraints.

The drawings illustrate the application of a filter embodying this invention. In this illustration the signals are seismic data from a 2D seismic survey with 45 sensors. These are either in a uniform linear array with 5 meter spacing or an irregular linear array as shown by FIG. 1 which shows the sensor interval, i.e. the distance from the previous sensor in a line.

The sensors observe seismic signals travelling in either direction projected on the receiver line. Signals travelling in one direction have a positive value of slowness while signals travelling in the reverse direction have a negative value of slowness. Consequently the passband may extend over a range of slowness from a negative value through zero to a positive value with stopbands at either side of the passband.

Figure 2A:
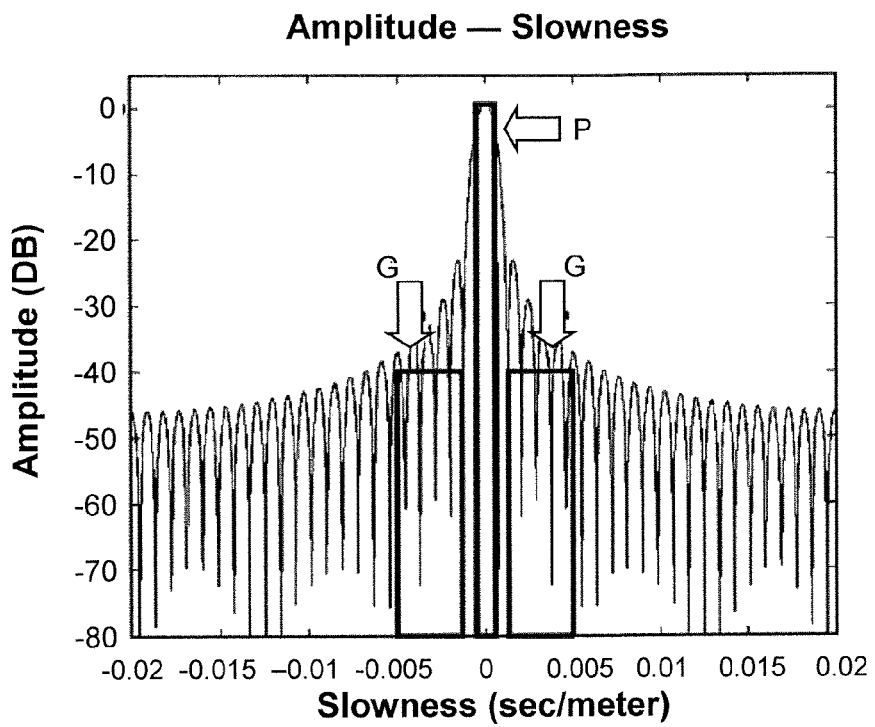
FIG. 2a shows the amplitude-slowness response when the sensor array has 45 sensors on a line with uniform spacing of 5 m interval at frequency of 5 Hz.
Figure 2B:
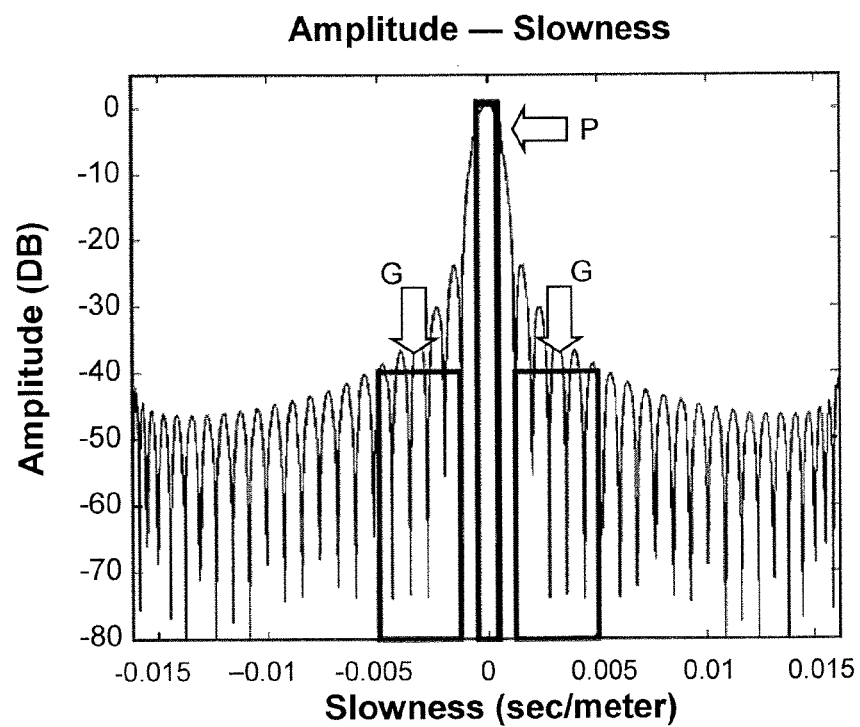
FIG. 2b shows the amplitude-slowness response when the sensor array of 45 sensors has irregular spacing as shown in FIG. 1, also at frequency of 5 Hz.

As an example, FIG. 2 shows the FIR response at a frequency of 5 Hz as calculated by the first term of equation (16) which, as mentioned above, is a weighted least square function (i.e. l=2) without added constraints. The slowness passband (also termed signal protection region) is between 0 and ~0.0005 sec/meter in either direction as indicated by the rectangle P. The stopbands at either side are >0.001 sec/meter in either direction. The slowness range of ground-roll is typically 0.001-0.005 sec/meter as indicated by rectangles G. At low frequency, the transition zone in the wavenumber domain is usually narrow with the same slowness range, which requires high order of filter. At higher frequency, the transition zone becomes wider which does not require a high order of filter. For seismic application, shorter spatial filters better preserve the (local) amplitude information of reflection signal than longer spatial filters. FIG. 2a shows the amplitude-slowness response of 45 sensors with 5 m interval. FIG. 2b shows the response of a similar sensor array but with irregular geometry as shown in FIG. 1. In both FIG. 2a and FIG. 2b it can be seen that the slowness range of ground roll is within the part of the stopbands adjacent to the passband. The output of the filter, seen as an undulating trace across the Figures, is approximating the ideal response.

The following iterative procedure is then used to reduce the levels in the stopband slowness range where the ground-roll or any other noises are:
1. Initialize the filter coefficients w with values calculated by the first term of equation (16)
2. The coefficient w is adjusted by $\Delta w$. The adjusted term $\Delta w$ is calculated by finding the solution of the following linearly constrained optimization problem, written as $$\min \Delta w^H R \Delta w + \mu \Delta w^H \Delta w \text{ subject to } C\Delta w = f \qquad (19)$$

where $\mu$ is a positive constant which penalizes large values of $\Delta w$, and $$R = \int_{slowness} v(\omega, p)v^H(\omega, p)dp \qquad (20)$$

or $$\int_\omega \int_{slowness} v(\omega, p)v^H(\omega, p)dp d\omega$$

The slowness range of integration in equation (20) is the slowness range of the ground-roll or any other noise that will be attenuated further to the specified level. The linear constrained matrix C is constructed by the following procedure. For the slowness range of signals, the same constraints of equation (7) with zero response used in the vector f can be used to protect the signals. To adjust the response in the slowness range used in the integration of equation (20) to the specified level, discrete slowness in the range can be used and the response value at each slowness is calculated by the following equation (Tseng and Griffiths, 1992 IEEE Trans. on signal processing, Volume 11 pages 2737-2745)

$$v_i^H \Delta w = f_i \text{ where } f_i = (\varepsilon - |c_i|)\frac{c_i}{|c_i|} \qquad (21)$$

$c_i$ is the response value calculated using current filter coefficients w, $\epsilon$ is the specified response value. A principal component analysis technique can be used to remove the linear dependency among constraints and therefore the singularity of matrix C of equation (19). The optimal adjusted coefficients $\Delta w$ is calculated by $$\Delta w = (R+\mu I)^{-1}C^H(C(R+\mu I)^{-1}C^H)^{-1}f \qquad (22)$$

3. Repeat step 2 until convergence when successive values of $\Delta w$ become small.

In general, the optimization of equation (19) also contains many local minima, the procedure described above can be possibly trapped by one of these local minima. The global optimal solution of equation (19) can be found by the Particle Swarm Optimization (PSO) instead of using equation (22).

Figure 3A:
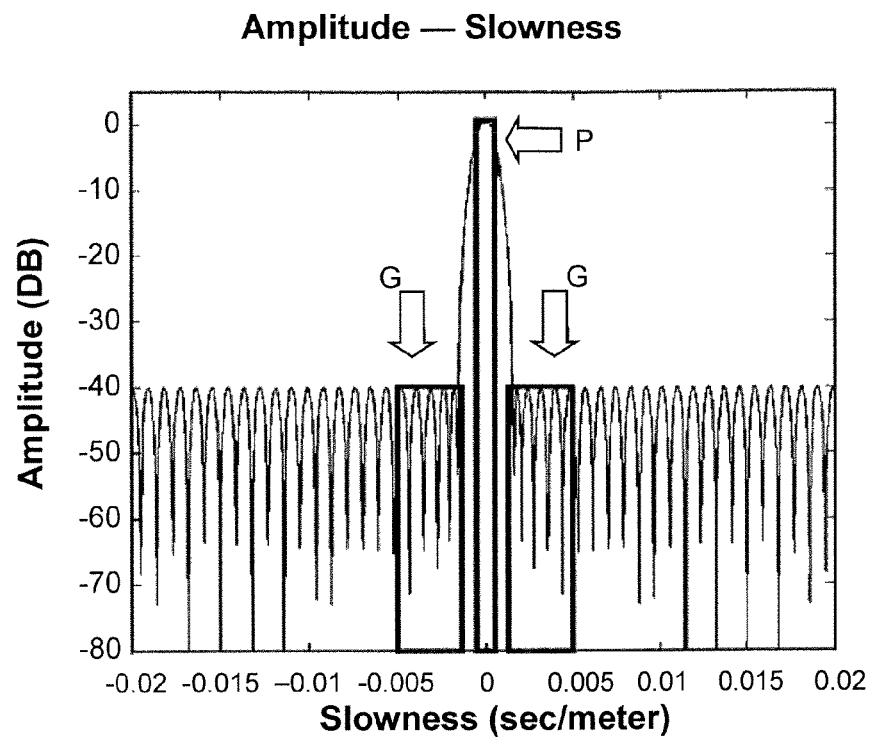
FIG. 3 shows the same examples as shown in FIG. 2 after further constraints are applied and the filter coefficients are calculated by an iterative procedure.
Figure 3B:
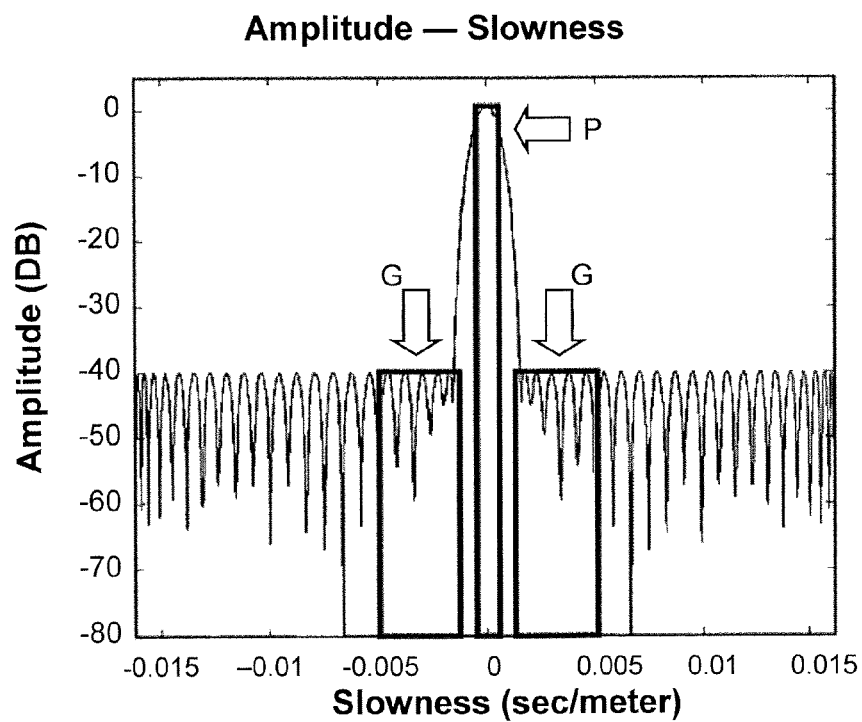

FIG. 3 shows the FIR response from FIG. 2 after application of the above iterative procedure. FIG. 3a is the response when the sensor spacing is regular. FIG. 3b is the response when the sensor geometry is irregular. Compared with FIG. 2 it can be seen in both cases that the stopband levels are now reduced to below the specified level of 40 dB at all slowness values in the stopband range without significantly broadening the passband.

The filter has good attenuation in the stopbands and only minor ripples within the passband.

The invention claimed is:
1. A method of seismic surveying comprising:
propagating an acoustic or electromagnetic field through at least one subsurface layer of the earth;

acquiring seismic data at a plurality of individual sensors for the field, placed at discrete locations spaced apart from one another;

storing the received seismic data in digital form on a non-transitory computer-readable storage medium; and operating a computer to process the stored digital seismic data by applying a filter to signals from individual sensors, wherein the filter contains filter coefficients and the computational processing comprises computing filter coefficients to minimise an l-norm function of differences between a response of the filter with the computed coefficients and a predetermined response which attenuates signals outside a predetermined range of slowness relative to signals within the predetermined range of slowness.

2. The method according to claim 1 wherein the computational processing comprises computing coefficients to minimize a said function over a range of frequencies.

3. The method according to claim 1 wherein the seismic data comprises a plurality of traces representing seismic energy received as a function of time at the sensors.

4. The method according to claim 3 wherein the locations of the sensors are irregularly spaced.

5. The method according to claim 3 wherein the locations of the sensors are spaced along a plurality of survey lines.

6. The method according to claim 1 wherein the value of l in the l-norm function is 2.

7. The method according to claim 1 wherein the value of l in the l-norm function is infinite.

8. The method according to claim 1 which imposes additional constraints on the coefficients to improve the attenuation of signals outside the predetermined range of slowness of the desired reflection signals.

9. The method according to claim 1 which imposes additional constraints on the coefficients to improve uniformity of response within the predetermined range of slowness.

10. The method according to claim 1 which is 3D seismic surveying.

11. The method according to claim 1 further comprising determining one or more parameters related to physical properties of the earth's interior from the processed data.

12. The method according to claim 1 wherein computing filter coefficients is repeated iteratively to minimise the l-norm function of differences between the response of the filter with the computed coefficients and the predetermined response.

13. A non-transitory computer readable storage medium having a computer program comprising instructions for carrying out processing according to claim 1 stored thereon.

14. The method of seismic surveying comprising:

propagating an acoustic or electromagnetic field through at least one subsurface layer of the earth;

acquiring digital seismic signals representing seismic energy received as a function of time at a plurality of individual sensors for the field, placed at discrete locations spaced apart from one another with irregular spacing;

storing the received digital seismic signals on a non-transitory computer-readable storage medium; and operating a computer to process the stored digital seismic signals by applying a filter to signals from individual sensors, wherein the filter contains filter coefficients and the computational processing comprises computing filter coefficients to minimize, over a range of frequencies, an l-norm function of differences between a response of the filter with the computed coefficients and a predetermined response which attenuates signals outside a predetermined range of slowness relative to signals within the predetermined range of slowness.

15. The method according to claim 14 which is 3D seismic surveying.

16. The method according to claim 14 further comprising determining one or more parameters related to physical properties of the earth's interior from the processed data.

17. The method according to claim 14 wherein computing filter coefficients is repeated iteratively to minimise the l-norm function of differences between the response of the filter with the computed coefficients and the predetermined response.

* * * * *